United States Patent

Arai et al.

[11] Patent Number: 5,818,454
[45] Date of Patent: Oct. 6, 1998

[54] IMAGE GENERATION METHOD AND IMAGE GENERATING APPARATUS

[75] Inventors: Masatoshi Arai; Masanori Kubo; Koichi Murakami, all of Kawasaki, Japan

[73] Assignee: Fujitsu Limited, Kawasaki, Japan

[21] Appl. No.: 633,420

[22] Filed: Apr. 17, 1996

[30] Foreign Application Priority Data

Sep. 28, 1995 [JP] Japan .................................. 7-251368

[51] Int. Cl.⁶ .................................................. G06T 11/00
[52] U.S. Cl. .......................................................... 345/431
[58] Field of Search ............................. 395/131; 345/421, 345/430, 431, 418, 419, 423, 424

[56] References Cited

U.S. PATENT DOCUMENTS

| | | | |
|---|---|---|---|
| 5,615,320 | 3/1997 | Lavendel | 395/131 |
| 5,627,950 | 5/1997 | Stokes | 395/131 |
| 5,652,831 | 7/1997 | Huang et al. | 395/131 |
| 5,659,673 | 8/1997 | Nonoshita | 395/131 |

*Primary Examiner*—Phu K. Nguyen
*Assistant Examiner*—Cliff N. Vo
*Attorney, Agent, or Firm*—Staas & Halsey

[57] ABSTRACT

An image generating apparatus has a command interpreting unit for interpreting external commands, an information storage unit storing information for image generation, an image selecting unit for selecting desired images from the information stored in the information storage unit, and an image display unit for displaying the images selected by the image selecting unit. The information storage unit includes an image information unit where image information is stored and a fake information unit where information for selecting images that do not produce unnatural visual effects is stored. Based on the information retrieved from the fake information unit, the image selecting unit selects and generates images in accordance with the content of interpretation from the command interpreting unit. The generated images are then within a range that does not produce unnatural visual effects.

11 Claims, 7 Drawing Sheets

FIG. 6

| P2<br>(SKY) | P3<br>(SKY) | P4<br>(TREE) |
|---|---|---|
| P5<br>(SKY) | P1<br>(SKY)<br>→(TREE) | P6<br>(TREE) |
| P7<br>(SKY) | P8<br>(SKY) | P9<br>(TREE) |

IMAGE GENERATION METHOD AND IMAGE GENERATING APPARATUS

BACKGROUND OF THE INVENTION

1. Field of the Invention

The present invention relates to a method and apparatus for generating an image, wherein display colors of pixels forming an object, background, etc. are determined by referencing a lookup table (hereinafter abbreviated LUT) that stores settings for a plurality of colors defined by combinations of three primary colors of various levels.

2. Description of Related Art

In recent years, demand for interaction between a human and a computer, generally known by the term man-machine interface or human-machine interface, has been increasing, and intuitive interactive methods utilizing the five senses of human beings have been developed using such techniques as artificial reality (AR) and virtual reality (VR). Also, in the field of personal computers (PCs), etc., apparatuses, exemplified by game machines, have been introduced that provide high-speed image generation and animation functions whereby images change in response to operations performed by human users.

Furthermore, with increasing performance of computer systems, artificial creatures constructed from autonomous object groups have come to be conceived, and attempts have been made to realize, using a computer, a world where such artificial creatures live. An image generating apparatus for generating images for displaying the actions of such artificial creatures has been proposed in a patent application filed by the present inventors (U.S. Pat. No. 5,724,499). According to this image generating apparatus, an action pattern that an artificial creature is thinking and wishing to perform is inputted as a command, and in accordance with the command, desired images are selected from a large number of stored image patterns, to generate and display successive images, thereby presenting the artificial creature's action as images and thus providing a participant with an experience as if he or she is in the real world.

In such an image generating apparatus, when displaying images of artificial creatures, surrounding natural objects (such as trees, mountains, rivers, clouds, etc.), and the background (such as the sky, ground, etc.), an LUT is used so that their display colors can be determined quickly. In such an LUT, combinations of three primary colors of various levels are mapped into unique numbers, and by referencing a number in the LUT, one display color can be specified.

Furthermore, in this type of image generating apparatus, if a higher sense of realism is to be presented to the participant by making artificial creatures act in various environments and yet displaying their movements as close as possible to the movements of real living creatures, display colors not only of the artificial creatures but also of the surrounding natural objects and background must be changed as the time and weather change. To achieve this, ideally a large number of display colors should be made ready for use when needed; in reality, however, since visual presentation of such artificial creatures is realized using a personal computer, memory capacity is limited and it is not possible to set a large number of display colors in an LUT.

Against this backdrop, the challenge for the designer is how an LUT with a limited number of display color settings can be effectively used to add realism to the movements of artificial creatures.

Further, when displaying an image of a rainfall, for example, it has been practiced to display a pattern of falling rain by using colors close to the background color, for example, by using two colors alternately assigned to a plurality of pixels contiguous in a vertical or oblique direction, one color being assigned to one pixel and the other color to the next pixel, and so on. This presents the problems that the display colors of rain are limited to two colors and that the transparency of raindrops cannot be presented satisfactorily. One possible approach to addressing this problem may be by setting in an LUT extra display colors created by adding transparency to display colors representing the background, but this is not a practical solution since this would lead to increasing the number of display color settings to be stored in the LUT.

SUMMARY OF THE INVENTION

It is an object of the invention to provide an image generation method and apparatus capable of achieving a dynamic use of an LUT in which display color settings are stored.

It is another object of the invention to provide an image generation method and apparatus capable of presenting an image with enhanced realism by using a limited number of display colors when displaying the boundary between two display objects (hereinafter simply called objects).

It is a further object of the invention to provide an image generation method and apparatus capable of presenting an image with enhanced realism by using a limited number of display colors when displaying an object of high transparency by overlaying it on a nontransparent object.

It is a still further object of the invention to provide an image generation method capable of presenting an image of flowing water such as rain giving the sense of transparency without using additional display colors.

According to the invention, when determining a display color for displaying an image of an object by referencing an LUT storing settings for a plurality of colors, the object is preassigned a predetermined number which is mapped in the LUT, and the LUT is referenced by using the predetermined number.

The predetermined number is an offset number, and the LUT is referenced by using a number obtained by adding the offset number to a color number unique to the object.

Further, a display color used when displaying an image of a boundary portion between a first object and a second object, is preset in the LUT. Also, a display color used when displaying an image of a first object in overlapping fashion with a semi-transparent second object located forward thereof, is preset in the LUT.

Moreover, when generating an image of flowing water against a background by specifying display colors for a plurality of pixels, one or more pixels neighboring a pixel not representing the background are selected from all pixels representing the background, and the display color of the one or more pixels is changed to the same color as the display color of the neighboring pixel not representing the background.

The above and further objects and features of the invention will more fully be apparent from the following detailed description with accompanying drawings.

BRIEF DESCRIPTION OF THE DRAWINGS

FIG. 6 is a schematic diagram showing conceptually how an image of flowing water is generated.

DESCRIPTION OF THE PREFERRED EMBODIMENTS

The present invention will be described in detail below with reference to the accompanying drawings.

Figure 1:
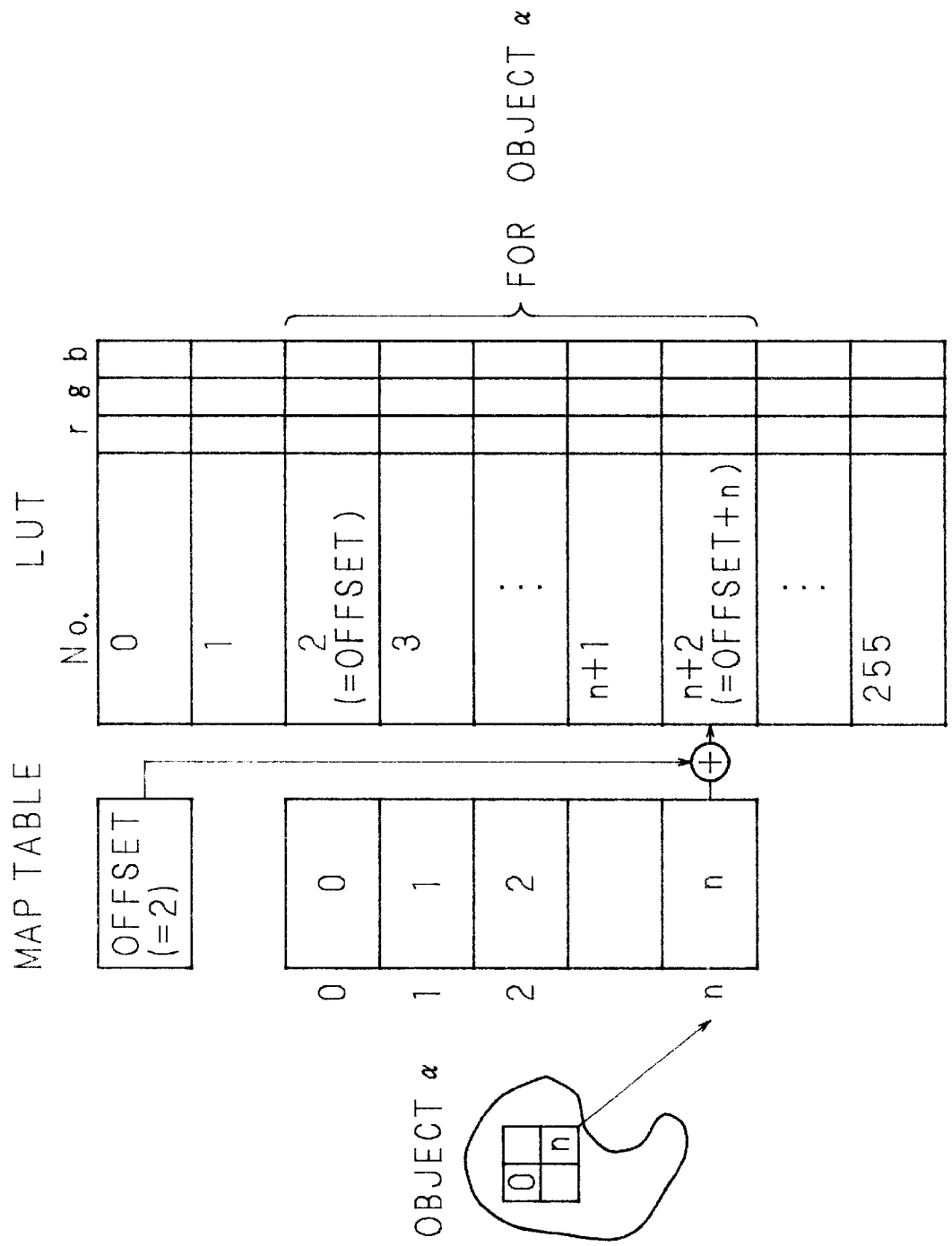
FIG. 1 is a schematic diagram showing an example of how display colors are assigned in an LUT according to the present invention.

FIG. 1 is a schematic diagram showing conceptually how display colors are assigned in an LUT. In the LUT shown in FIG. 1, a plurality of colors (256 colors in the example of FIG. 1) defined by combinations of three primary colors, r, g, and b, of various levels, are set in order of increasing numbers (from 0 to 255 in the example of FIG. 1). An image of each object is displayed using a number of display colors selected from the plurality of colors set in the LUT; the display colors used to display each object have consecutive numbers on the LUT. In the example of FIG. 1, (n+1) display colors are assigned to an object α, and these (n+1) display colors are sequentially numbered starting at 2 and ending at (n+2) on the LUT.

Here, the LUT number of the display color having the smallest LUT number of all the display colors used to display an object, that is, the starting number of the object in the LUT (2 for the object α shown in FIG. 1), is set as the offset number for that object. When selecting a desired display color set in the LUT, the offset number unique to the desired object (2 in the case of the object α) is added to a predetermined number (a number between 0 and n in the case of the object α), thus designating the desired LUT number and thereby determining the desired display color. By predetermining an offset number for each object in this way, the number of bits used to designate a number can be reduced dramatically, compared to a method of simply designating a desired LUT number.

Furthermore, the use of an offset number makes it easier to change the number of display colors assigned to an object, on an object-by-object basis. To give an example of changing the number of assigned display colors, it would be possible to reduce the number of display colors assigned to an artificial creature when displaying it in a nighttime scene than when displaying it in a daytime scene, since it is less visible in the nighttime. The number of display colors thus saved can then be used, for example, for displaying an image of a firefly emitting a glow which can only be seen in the nighttime.

Figure 2:
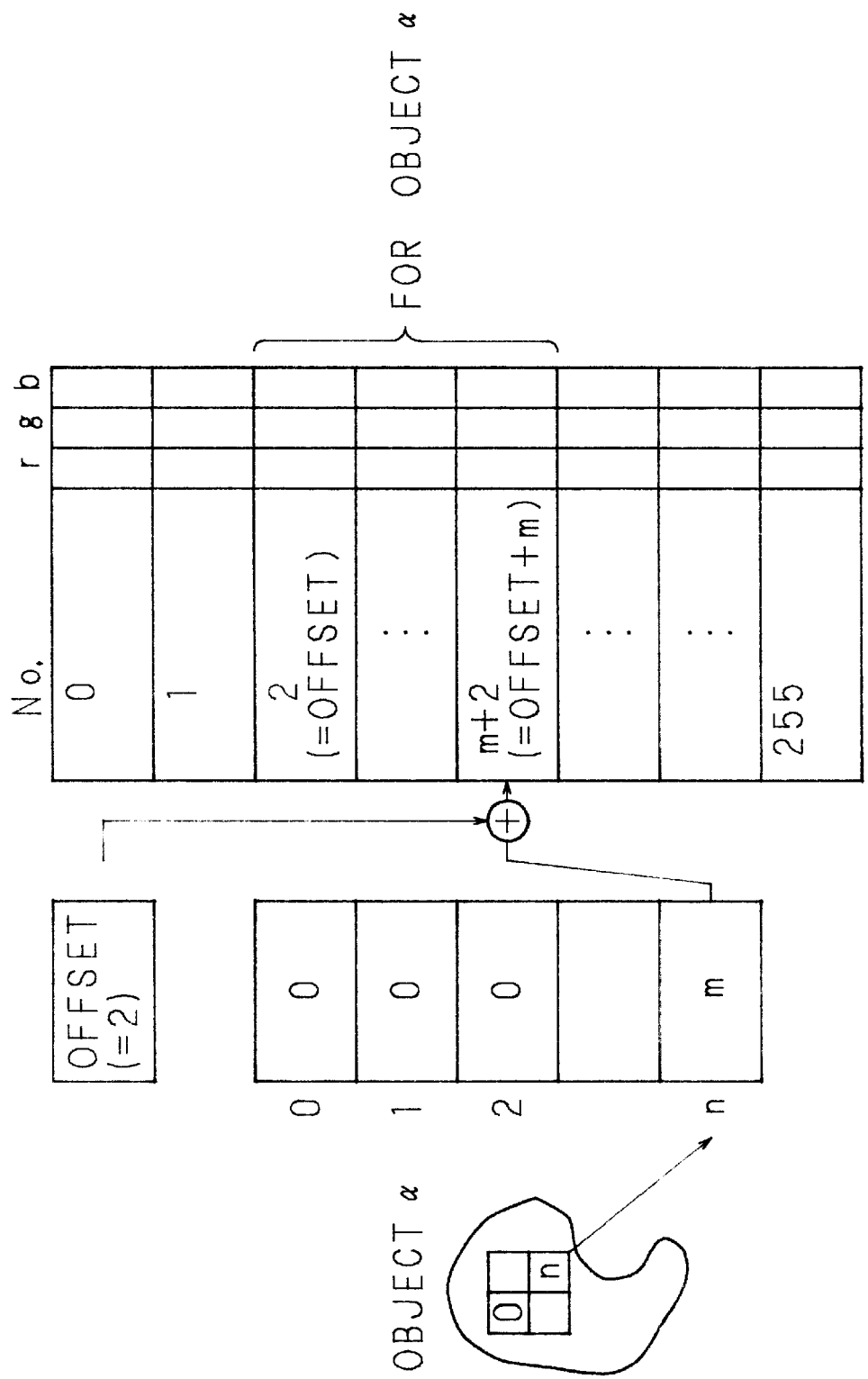
FIG. 2 is a schematic diagram showing another example of how display colors are assigned in the LUT according to the present invention.

FIG. 2 is a schematic diagram showing an example of how the number of assigned display colors is changed. For the object α, (n+1) display colors are assigned in the example of FIG. 1; on the other hand, (m+1) display colors are assigned in the example shown in FIG. 2. The offset number is 2 in either example. Even when the number of display colors is changed, as shown in FIG. 2, the desired display color can be determined likewise by adding a desired number, between 0 and m, to the offset number 2 and thereby designating the desired LUT number. Since the number of display colors assigned to each object can be easily changed, as described above, the plurality of display colors (for example, 256 colors) set in the LUT can be dynamically utilized.

Figure 3:
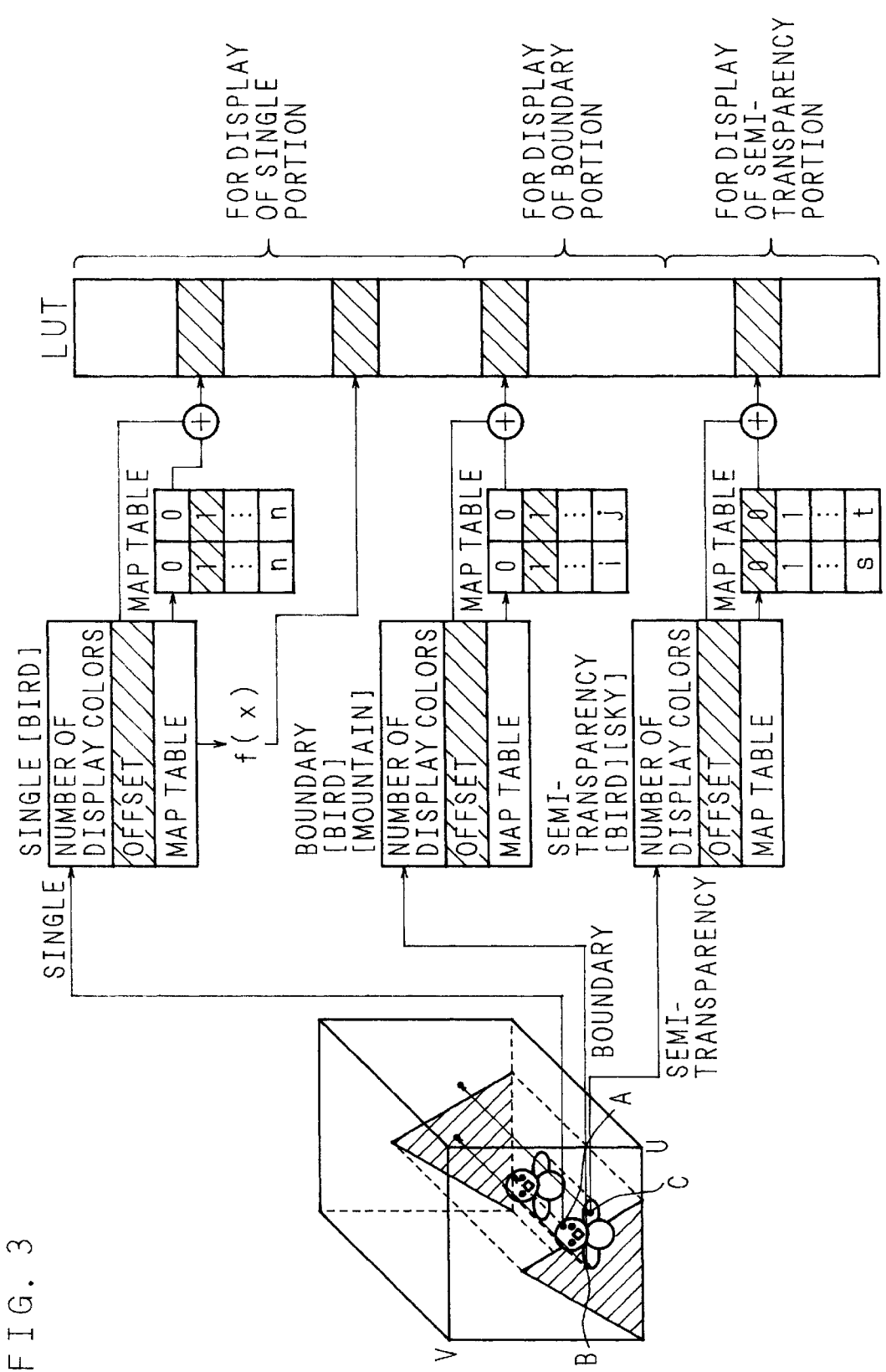
FIG. 3 is a schematic diagram showing conceptually how display colors are assigned in the LUT according to the present invention.

In the left side of FIG. 3 is shown an example of an image, which is an image of a scene showing a bird, an artificial creature, flapping its wings with a mountain behind it. The background is the sky. Pixel A on the two-dimensional screen (in a U-V coordinate system) forms part of the bird's head with the sky as the background; therefore, a display color representing the bird's head should be used for this pixel. Pixel B lies on the boundary between the bird and the mountain (the two objects); a display color formed from a mixture of the display colors of the bird and the mountain is used for this pixel. Further, pixel C forms part of the bird's wings, but since the bird is flapping its wings, the color of the wings is not clearly discernible and looks semi-transparent, allowing the background sky (ordinary object) to be seen through the semi-transparent wings of the bird (semi-transparent object); therefore, a display color assigned to a semi-transparency portion is used for this pixel.

Taking the pixels A, B, and C as an example, we will describe how the LUT numbers are designated. The plurality of display colors set in the LUT are grouped into display colors used for displaying single objects such as pixel A, display colors used for displaying boundary portions between two objects such as pixel B, and display colors used for displaying semi-transparency portions such as pixel C, these display colors being mapped in order of increasing numbers.

First, a method of designating the LUT number for pixel A will be described. Value 1 in the map table is added to the offset number set for the object, bird, to obtain a LUT number, and the display color mapped to that number is selected. The "number of display colors" item in the figure contains the total number of display colors used for displaying the bird ((n+1) in the example shown here). When displaying a single object, if there is a need to increase the redness because of an evening glow, or to lower the levels of the three primary colors as a whole because of a darkened environment, it is possible to convert such a need using a function f(x) and designate the desired LUT number.

For pixel B representing the boundary portion, value 1 in the map table is added to the offset number set for the boundary between the bird and the mountain, to obtain a LUT number, and the display color mapped to that number is selected. The "number of display colors" item in the figure contains the total number of display colors used for displaying the bird (or the mountain) singly ((i+1) in the example shown here). The total number of display colors assigned to the boundary portion between the bird and the mountain is (j+1). Here, there is a relation i>j between i and j. This is because not so many display colors are needed for displaying the boundary portion since a display color averaging between the representative colors of the two objects (the bird and mountain in this example) will suffice for the purpose. In this case, the representative color of either one object may be used in preference to the other, and weighting may be applied when taking the average.

For pixel C representing the semi-transparency portion, value 0 in the map table is added to the offset number set for the semi-transparency portion between the bird and the sky, to obtain a LUT number, and the display color mapped to that number is selected. The "number of display colors" item in the figure contains the total number of display colors used for displaying the bird (or the sky) singly ((s+1) in the example shown here). The total number of display colors assigned to the semi-transparency portion between the bird and the sky is (t+1). Here, there is a relation s>t between s and t. This is because not so many display colors are needed since an object (the sky in this example) seen through a semi-transparent object (the wings of the bird in this example) need only be displayed with some blurring.

Figure 4:
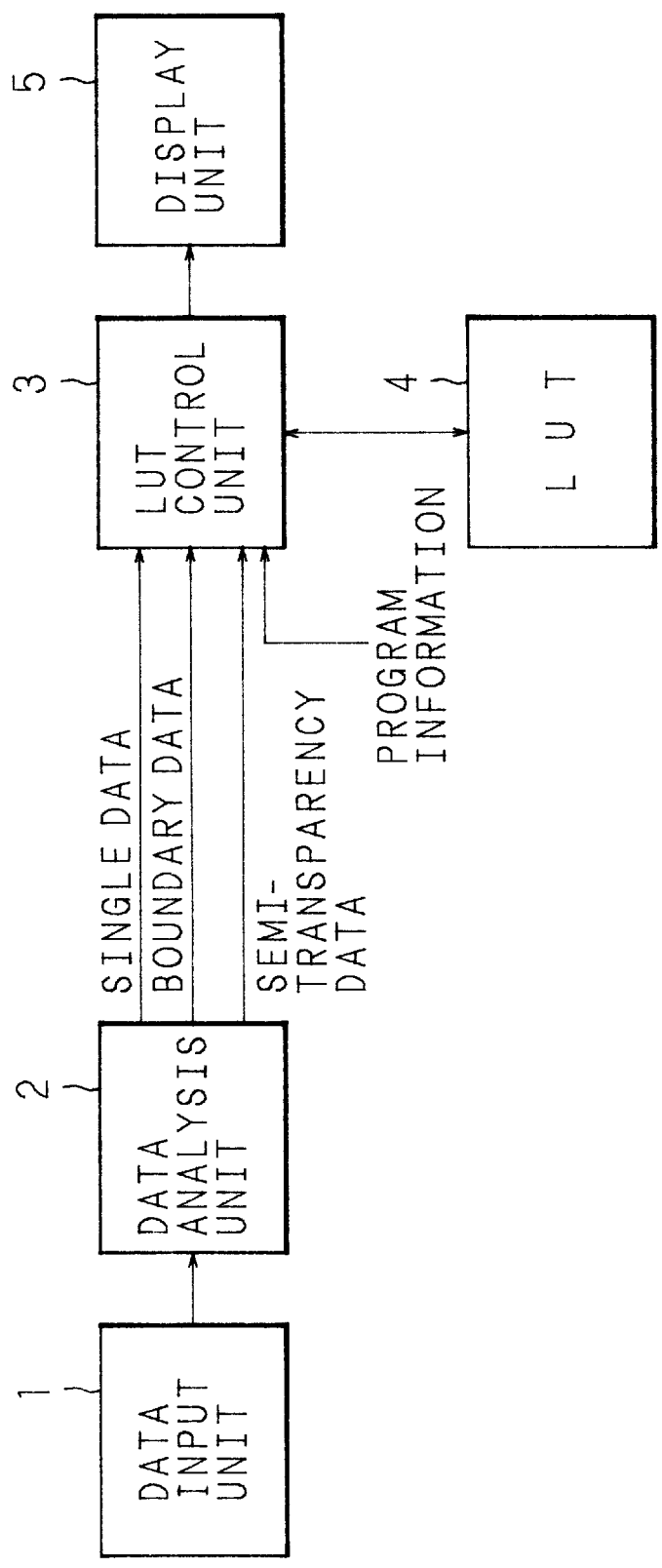
FIG. 4 is a block diagram showing the configuration of an image generating apparatus according to the present invention.

FIG. 4 is a block diagram showing the configuration of an image generating apparatus according to the present invention. In FIG. 4, reference numeral 1 designates a data input unit to which pixel data is inputted. The data input unit 1 supplies the input pixel data to a data analysis unit 2. The data analysis unit 2 analyzes the data to determine the type of object part of which the pixel forms, and classifies the pixel as one of the three types of pixel, that is, a pixel singly forming part of an object (for example, pixel A in FIG. 3), a pixel forming a boundary portion between two objects (for example, pixel B in FIG. 3), or a pixel forming a portion where a semi-transparent object is overlaid on an ordinary object (for example, pixel C in FIG. 3). The pixel data thus classified is supplied to an LUT control unit 3. If it is desired to set a particular scene (such as the setting for an evening glow), program information defining such a setting is also supplied to the LUT control unit 3. Based on the pixel data and the program information thus inputted, the LUT control unit 3 designates the number in an LUT 4 pixel by pixel, and outputs the data of the display color mapped to the designated number, which data is supplied to a display unit 5. The display unit 5 displays an image based on the pixel-by-pixel display color data supplied from the LUT control unit 3.

Next, the operation of the above apparatus will be described. Pixel data is inputted via the data input unit 1 into the data analysis unit 2, and after being classified as one of the three types of pixel pattern, as described above, the data is supplied to the LUT control unit 3. In the case of a pixel forming part of a single object, the value in the map table is added to the offset number set for that single object, to designate the number in the LUT 4, as previously described (see FIG. 3). If program information defining a particular scene is inputted at this time, a new number in the LUT 4 for that single object is designated in accordance with a function f(x) appropriate to the program information (see FIG. 3).

In the case of a pixel forming a boundary portion, the value in the map table is added to the offset number set for the boundary portion, to designate the number in the LUT 4, as previously described (see FIG. 3). In the case of a pixel forming a semi-transparency portion, the value in the map table is added to the offset number set for the semi-transparency portion, to designate the number in the LUT 4, as previously described (see FIG. 3).

The display color data stored at the number designated in the LUT 4 for each pixel is retrieved from the LUT 4 and inputted to the display unit 5. The display unit 5 displays an image formed by these pixels with selected display colors.

Figure 5:
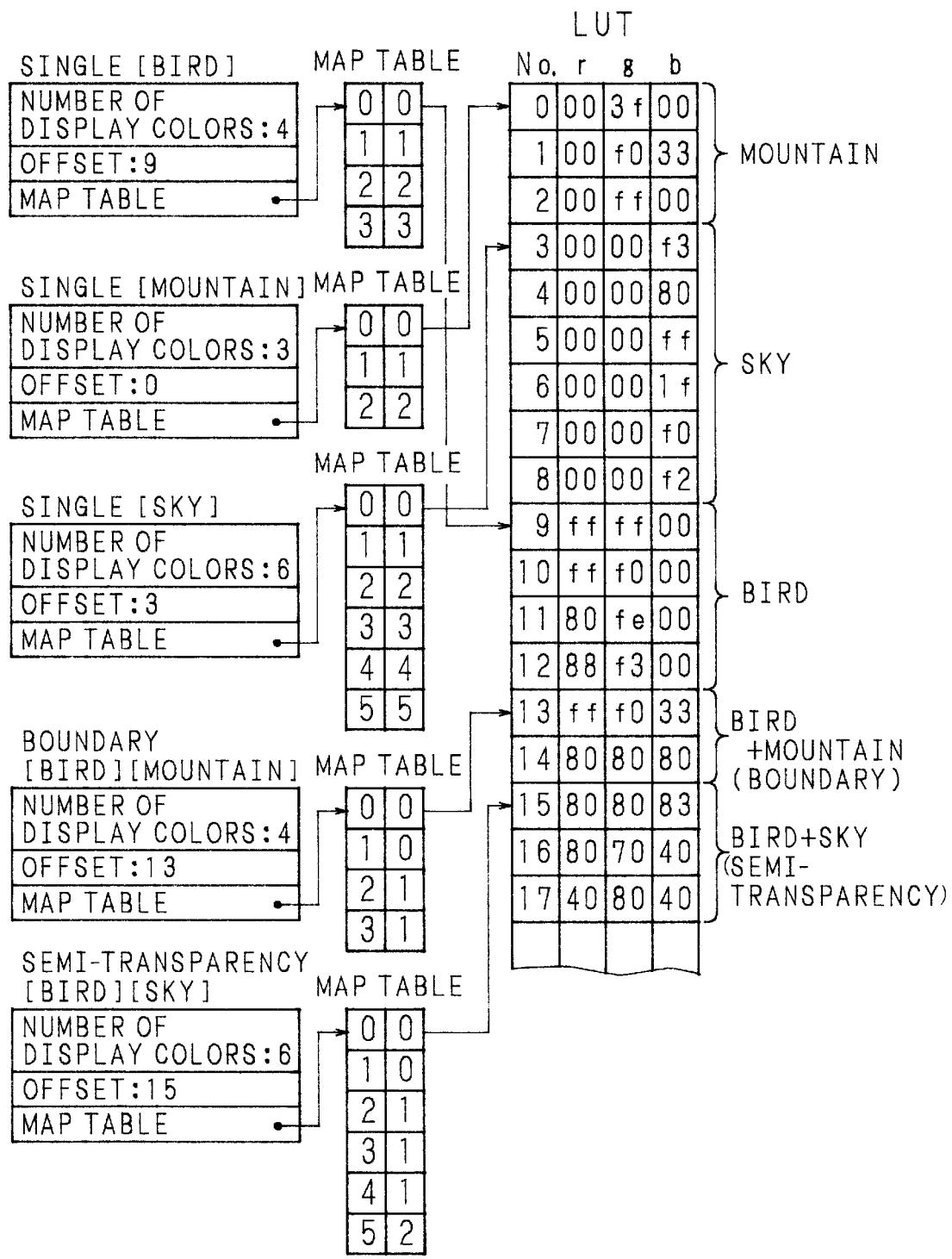
FIG. 5 is a schematic diagram showing a specific example of display color selection in the LUT according to the present invention.

Next, a specific example will be given of an image formed by pixels with their display colors selected as described above. FIG. 5 is a schematic diagram showing this specific example. The image contains three kinds of objects: a bird as an artificial object, a mountain as a natural object, and the sky as the background. The display colors at numbers 0 to 2 in the LUT are assigned to the mountain as a single object, and the display colors at numbers 3 to 8 and at numbers 9 to 12 are assigned to the sky as a single object and the bird as a single object, respectively. Further, the display colors at numbers 13 and 14 in the LUT are assigned to the boundary portion between the bird and the mountain, and the display colors at number 15 to 17 are assigned to the semi-transparency portion between the bird and the sky.

In the example shown in FIG. 5, the emphasis is on a moving object in the case of the boundary portion, and the "number of display colors" is 4 which is the same as the "number of display colors" for the bird as a single object, while, in the case of the semi-transparency portion, the emphasis is on a stationary object, and the "number of display colors" is 6 which is the same as the "number of display colors" for the sky as a single object. Then, in the case of the boundary portion, the number of display colors assigned to it is decimated by a factor of 2, i.e., from 4 assigned to the bird as a single object to 2. Likewise, the number of display colors assigned to the semi-transparency portion is decimated by a factor of 3, i.e., from 6 assigned to the sky as a single object to 3.

As described, according to the present invention, since the LUT is controlled using offset numbers, the number of bits used can be reduced, and the number of display colors assigned to each object can be easily changed. This greatly improves the utilization of the LUT whose capacity to store display color settings is limited.

Furthermore, for pixels representing the boundary between two objects, and also, for pixels representing portions where a semi-transparent object is overlaid on a nontransparent object, the number of display colors set in the LUT is made smaller than the number of display colors assigned when displaying each of the objects singly. Accordingly, an image full of reality can be presented with a limited number of display colors by making effective use of the LUT.

FIG. 6 is a schematic diagram conceptually showing how an image of flowing water is created according to the present invention. FIG. 6 shows pixel P1 at the center and its eight neighboring pixels P2 to P9. The three vertically-contiguous pixels P4, P6, and P9 form a certain object (for example, a tree), and the remaining six pixels form the background (for example, the sky). In this condition, the center pixel P1 is set to the same display color as that of one of the pixels P4, P6, and P9. This produces the effect of refracted light and thereby expresses transparent rain. That is, by making use of the principle that a succession of the same colors makes light look refracted, an image of falling transparent rain can be presented.

Figures 7A, 7B:
FIGS. 7A and 7B are schematic diagrams showing an example of how transparent rain is expressed.

An example of how an image of transparent rain is displayed will be described with reference to FIGS. 7A and 7B. FIG. 7A shows the display conditions of nine pixels when not displaying transparent rain, and FIG. 7B shows the display conditions of the nine pixels when displaying transparent rain. When it is desired to display transparent rain, the pixel conditions are changed from those shown in FIG. 7A to those shown in FIG. 7B. Hatched pixels in FIG. 7B are pixels changed to display colors representing a neighboring "tree" or "leaf". In this way, light looks refracted so that an image of falling transparent rain can be produced.

The above has described the example of displaying transparent rain, but it will be recognized that the above technique can be applied when displaying other water flows than rain, such as waterfalls, rivers, etc.

In this way, transparent water flows are expressed by transferring to background pixels the display colors of the surrounding pixels displaying an object; therefore, an image of flowing water such as rain giving the sense of transparency can be presented without using additional display colors.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image generating method for displaying an image of an object in color by referring to a lookup table, the method comprising the steps of:

setting serial numbers representing display colors in the lookup table;

assigning to each object a number selected from the serial numbers which corresponds to a desired display color; and referring to said lookup table by using said assigned numbers to determine the display color.

2. An image generation method according to claim 1, further comprising the step of setting a display color in said lookup table for displaying a boundary portion between a first object and a second object.

3. An image generation method according to claim 1, further comprising the step of setting a display color in said lookup table for displaying a non-transparent object and a semi-transparent object in an overlapping manner.

4. An image generation method according to claim 1, wherein each assigned number is an offset number, and said lookup table is referenced by adding each offset number to a color number unique to each respective object.

5. An image generation method according to claim 4, wherein a display color, used when displaying an image of a boundary portion between a first object and a second object, is preset in said lookup table.

6. An image generation method according to claim 4, wherein a display color, used when displaying an image of a first object in overlapping fashion with a semi-transparent second object located forward thereof, is preset in said lookup table.

7. An image generation method for generating an image of flowing water against a background in a color selected from a plurality of colors of pixels, comprising the steps of:

detecting a portion of background-representing pixels located adjacent to a pixel not representing the background; and changing the color of said detected pixel portion into the display color of said adjacent pixel.

8. An image generation apparatus for displaying an image of an object in color by referring to a lookup table, the apparatus comprising:

a lookup table for storing serial numbers representing display colors;

means for assigning to each object a number selected from the serial numbers which correspond to a desired display color; and means for referring to said lookup table by using an assigned number to determine the display color.

9. An image generating apparatus according to claim 8, wherein each assigned number is an offset number, and said referencing means references said lookup table by adding each offset number to a color number unique to each respective object.

10. An image generating apparatus according to claim 8, wherein said lookup table stores a setting for a display color used when displaying an image of a boundary portion between a first object and a second object.

11. An image generating apparatus according to claim 8, wherein said lookup table stores a setting for a display color used when displaying an image of a first object in overlapping fashion with a semi-transparent second object located forward thereof.

* * * * *